US007942732B2

(12) United States Patent
Nelson

(10) Patent No.: US 7,942,732 B2
(45) Date of Patent: May 17, 2011

(54) WAGERING GAME AND METHOD HAVING A SIMULTANEOUS MULTI-PLAY FEATURE

(75) Inventor: Loren T. Nelson, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 732 days.

(21) Appl. No.: 11/935,337

(22) Filed: Nov. 5, 2007

(65) Prior Publication Data

US 2008/0113752 A1 May 15, 2008

Related U.S. Application Data

(60) Provisional application No. 60/865,388, filed on Nov. 10, 2006.

(51) Int. Cl.
*G06F 17/00* (2006.01)
*G06F 19/00* (2011.01)

(52) U.S. Cl. ................ 463/16; 463/20; 463/29; 463/30; 273/138.1

(58) Field of Classification Search .............. 463/16–20, 463/25, 29–31; 273/138.1
See application file for complete search history.

(56) References Cited

U.S. PATENT DOCUMENTS

| | | | | |
|---|---|---|---|---|
| 4,856,787 | A | 8/1989 | Itkis | |
| 5,664,998 | A | 9/1997 | Seelig et al. | |
| 5,919,088 | A * | 7/1999 | Weiss | 463/9 |
| 6,062,980 | A * | 5/2000 | Luciano | 463/20 |
| 6,159,095 | A * | 12/2000 | Frohm et al. | 463/19 |
| 6,186,894 | B1 * | 2/2001 | Mayeroff | 463/20 |
| 6,203,429 | B1 * | 3/2001 | Demar et al. | 463/20 |
| 6,270,409 | B1 * | 8/2001 | Shuster | 463/20 |
| 6,270,412 | B1 * | 8/2001 | Crawford et al. | 463/20 |
| 6,328,649 | B1 * | 12/2001 | Randall et al. | 463/20 |
| 6,634,945 | B2 | 10/2003 | Glavich et al. | |
| 7,156,741 | B2 * | 1/2007 | Hornik et al. | 463/40 |
| 2001/0055989 | A1 * | 12/2001 | Thomas | 463/16 |
| 2002/0183105 | A1 * | 12/2002 | Cannon et al. | 463/16 |
| 2003/0060268 | A1 * | 3/2003 | Falconer | 463/20 |
| 2004/0097286 | A1 * | 5/2004 | Vancura | 463/26 |
| 2004/0192431 | A1 * | 9/2004 | Singer et al. | 463/20 |
| 2006/0046830 | A1 * | 3/2006 | Webb | 463/20 |
| 2006/0189377 | A1 * | 8/2006 | Gomez et al. | 463/20 |
| 2006/0287060 | A1 * | 12/2006 | Yoshimi | 463/20 |
| 2008/0064480 | A1 * | 3/2008 | Randall | 463/20 |
| 2008/0070668 | A1 * | 3/2008 | Castellari | 463/16 |
| 2008/0200232 | A1 * | 8/2008 | Baerlocher et al. | 463/20 |
| 2008/0227523 | A1 * | 9/2008 | Vallejo et al. | 463/20 |

* cited by examiner

*Primary Examiner* — Milap Shah

(74) *Attorney, Agent, or Firm* — Marvin A. Hein; J. P. Cody

(57) ABSTRACT

Wagering games, gaming machines, networked gaming systems and associated methods are disclosed that include a simultaneous multi-play feature. One disclosed aspect provides for multiple sets of reels which spin simultaneously, each reel set corresponding to a particular objective. Another disclosed aspect provides that an award be paid based on the number of achieved objectives at the end of the game.

7 Claims, 8 Drawing Sheets

WAGERING GAME AND METHOD HAVING A SIMULTANEOUS MULTI-PLAY FEATURE

CROSS-REFERENCE TO RELATED APPLICATIONS

This application claims priority from provisional application 60/865,388, filed on Nov. 10, 2006.

This application is also related to U.S. patent application Ser. No. 11/935,346 entitled "GAMING MACHINE AND METHOD HAVING A SIMULTANEOUS MULTI-PLAY FEATURE," filed on Nov. 5, 2007 which claims priority from provisional application 60/865,388 filed on Nov. 10, 2006.

This application is also related to U.S. patent application Ser. No. 11/935,349 entitled "NETWORKED GAMING SYSTEM AND METHOD HAVING A SIMULTANEOUS MULTI-PLAY FEATURE," filed on Nov. 5, 2007 which claims priority from provisional application 60/865,388 filed on Nov. 10, 2006.

All of the above referenced applications are hereby incorporated by reference in their entireties for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention is directed to wagering games and methods and, more particularly, to wagering games and methods with a simultaneous multi-play feature.

2. Description of the Related Art

In the prior art, various types of gaming machines have been developed with different features to captivate and maintain player interest. In general, a gaming machine allows a player to play a game in exchange for a wager. Depending on the outcome of the game, the player may be entitled to an award which is paid to the player by the gaming machine, normally in the form of currency or game credits. Gaming machines may include flashing displays, lighted displays, or sound effects to capture a player's interest in a gaming device.

Another important feature of maintaining player interest in a gaming machine includes providing the player with many opportunities to win awards, such as cash or prizes. For example, in some slot machines, the display windows show more than one adjacent symbol on each reel, thereby allowing for multiple-line betting. Some gaming machines offer a player the opportunity to win millions of dollars by providing progressive jackpots. Additionally, feature games of various types have been employed to reward players above the amounts normally awarded on a standard game pay schedule. Generally, such feature games are triggered by predetermined events such as one or more appearances of certain combinations of indicia in a primary game. In order to stimulate interest, feature games are typically set to occur at a gaming machine on a statistical cycle based upon the number of primary game plays.

One example of a gaming machine with a simultaneous multi-play presentation is called the Totem gaming machine. In that example, three or more slot machines are stacked, one on top of the other. Upon the start of game play, each of the slot machines in the stack may spin its reels to determine a game outcome for each machine if a player has included a wager for each of the stacked slot machines. Each individual game outcome is evaluated against a pay table associated with that game and a payout is made according to the sum of any winning outcomes in the stack. One drawback to the Totem game is that the connection of multiple slot machine cabinets together creates an extremely large device that is expensive to construct and maintain.

Another example of a gaming machine with multi-play presentation is a multi-line gaming machine which may be a mechanical reel or video display style gaming machine. In these examples, the column-wise indicia are generally fixed in relation to each other. These and other examples in the prior art have been described to provide a player with more excitement. There continues to be a need for more innovative games and gaming machines to stimulate and excite players.

SUMMARY OF THE INVENTION

In accordance with one or more aspects of the invention, a wagering game includes a plurality of indicia-bearing reel sets. A set of possible outcomes is associated with each reel set and an achievable objective is associated with each set of possible outcomes. During a play of the game, a certain number of attempts to achieve each objective are allowed. For each attempt, one of each set of possible reel set outcomes is determined and displayed by its associated set of reels. When all allowed attempts have been completed, an award is payable to a player of the game if at least one of the objectives was achieved.

In accordance with another aspect of one or more embodiments of the invention, a method of operating a game includes the steps of accepting a wager from a player; initiating play of the game according to the wager and, upon a triggering event associated with the game, providing a feature game comprising a plurality of attempts to complete a series of objectives ordered first to last. Each objective is associated with a separate set of indicia-bearing reels. For each attempt, the plurality of reel sets is positioned to display an outcome for each reel set. The displayed outcome on each reel set is compared with its corresponding objective to determine if the objective has been completed. The method further includes the step of, at the conclusion of the feature game, paying an award to the player in accordance with the objectives that were completed during the feature game.

Other features and advantages will become apparent from the following detailed description, taken in conjunction with the accompanying drawings, which illustrate by way of example, the features of the various embodiments.

DETAILED DESCRIPTION OF THE INVENTION

Figure 1:
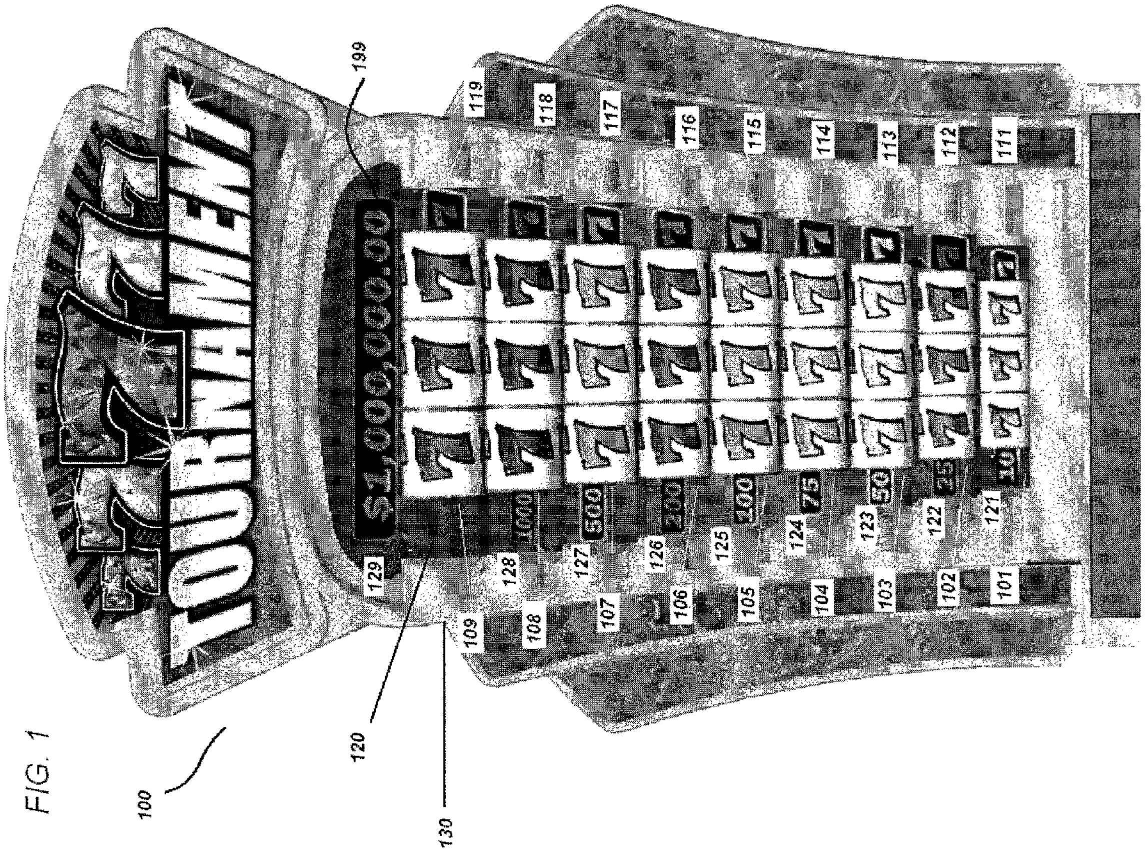
FIG. 1 illustrates an example feature game display in accordance with one or more embodiments of the invention.

Various embodiments are directed to a wagering game associated method including a simultaneous multi-play feature. Embodiments of the invention are illustrated and described herein, by way of example only, and not by way of limitation. Referring now to the drawings, and more particularly to FIGS. 1-7, there are shown illustrative examples of a game, gaming machine, networked gaming system and associated methods in accordance with various aspects of the invention.

In one embodiment of the invention, a game includes a feature game that provides a player with a series of objectives to complete and a limited number of attempts to complete the objectives. As the player completes each objective, the potential award value associated with the feature game increases. The number of attempts allowed may be a fixed number or may be randomly determined by an aspect of the game, such as a random number generator driven by a game processor, or a random selection by a player from a deck of cards, or one or more dice tossed by a player. In one embodiment, the number of attempts or plays of the feature game may be limited by a pre-determined time, such as five, ten, or twenty seconds of elapsed time of a clock associated with the game.

In one embodiment, the objectives must be completed in a specific order. The player has a predetermined number of attempts in which to complete each objective. If the player completes the current objective in fewer attempts than allowed, the remaining attempts may be added to the number of attempts allowed for the next objective. If the player completes an objective out of sequence, the completion of that objective is held until the player has progressed to that objective. At that time, the player may be credited for completing that objective. Once the player has exhausted all allowed attempts, the player is awarded a prize based on the highest objective completed in the sequence. This prize may be a progressive award.

In one or more embodiments, the objectives may be represented as multiple sets of spinning reels. These sets may be stacked vertically with the reels representing the first objective at the bottom of the stack and the reels representing the final objective at the top of the stack. The objective and the prize value associated with each objective are displayed adjacent to each set of reels. For example, the objective for the first set of reels might be to obtain three blue sevens for an award of 10 credits. Also displayed may be an indicator displaying the number of spins the player is allowed in order to complete the objective. The game may play without player interaction, or the player may start or terminate each spin, for example, by way of user controls. Once the player has scored the immediate target objective, the game advances to the next objective in sequence and any remaining attempts from the previous objective are added to the possible attempts for the new objective.

Referring to FIG. 1, in accordance with one aspect of the invention, an example feature game 100 is implemented using nine independent rows of randomly or pseudo-randomly spinning reels 101-109. Starting with row 101, the player may be given, for example, three plays where an initial play comprises simultaneous spins of each row. The objective being to reach the top award by matching each of rows 101-109 as shown in FIG. 1, to win a progressive award displayed on progressive meter 199. After each play, if one or more sets of reels have respective matching values, then those sets may be fixed for the next play and so forth. At the conclusion of play, the winnings may be accumulated in accordance with the values associated with each matching set of reels. Alternatively, a winning award may comprise a sum of the awards of matching reel sets beginning from the lowest set of reels and moving upward until a nonmatching set is encountered. Alternatively, a winning award may only be the award associated with highest set of successively matching sets of reels beginning from the bottom and moving upward.

Each set of reels in rows 101-109 is identical and each set spins in synchronization with all other sets. For example, on the first spin, the first, second and third reels of row 101 and the first, second and third reel of rows 102-109 will show the same indicia at the same time when the reels are spinning and come to a stop. In some embodiments, the reel sets may not be identical and may spin independently to different results. Each set of reels for rows 101-109 has a corresponding objective symbol 111-119 indicating the symbols required to collect the row and an associated prize 121-129. In this embodiment, a symbol matching the displayed objective symbol must appear on each of the three reels in order to accomplish the objective, for example, BLUE 7-BLUE 7-BLUE 7. In other embodiments, the symbol required on each of the three reels may be different, for example, BAR-CHERRY-BELL.

The feature game starts with a video representation of reel sets 101-109 spinning and stopping in their predetermined stop positions displayed on top box display 120. In the case of a video display, the reels are conventionally simulated and the reel symbols randomly determined by a gaming processor on a gaming motherboard, such as a commercially available Bally Technologies Alpha game board. In the case of actual reels, the reels may be driven by stepper motors or other conventional mechanical or electro-mechanical mechanisms linked to a game initiating device such as an arm attached to a rotatable master shaft connecting to respective conventional rotatable shafts where each of the respective sets of reels is randomly spinnable about respective shafts.

The rectangular shape of display 120 is partially disguised by top box trim bezel 130. This allows a generic top box cabinet and display to be used for a variety of game presentations while still providing a custom look and feel to the game. In alternate embodiments, the game may be implemented using electro-mechanical reels in place of video display 120. The stopped positions of the reels are evaluated against the objective symbols to see if the final symbol combination resulted in a winning game outcome. A winning game outcome comprises three identical symbols on each of the first, second and third reels in a row 101-109 matching the objective symbol 111-119 for that row. For example, the occurrence of three blue sevens on row 108, designated by objective symbol 118 displaying a blue seven, would result in row 108 being "collected" by the player. For all subsequent spins, row 108 would be "frozen," and would not spin with the other reel sets 101-107 and 109. Each of rows 101-109 is evaluated to see if a winning game outcome applies to that row. A remaining spin counter, previously initialized for the current objective row, is decremented by one and the process repeats. For example, following the first spin, the counter for row 101 would be decremented to 2. If the player happens to collect row 101 on the first spin, the remaining attempts available for the accomplishment of row 101 may be added to the available attempts for the accomplishment of row 102. In this example, the player would then have five attempts to collect row 102 (two spins remaining from row 101 plus three spins originally allocated for row 102).

In an alternate embodiment, the remaining spins attempts are not added to the number of attempts for the next objective. In still another embodiment, when any objective is completed, whether in sequence or not, the number of attempts is reset to the initial value, for example, three.

The feature game terminates when all spins allowed for a particular row have occurred or when all rows have been collected, whichever comes first. At the end of each spin, the collected rows are evaluated. Beginning with row 101, each row is examined to determine if it has been collected, the remaining spin counter for the target row is decremented and, if non-zero, another spin performed. If the remaining spin counter decrements to zero before the objective for the current target row is achieved, the feature game concludes. The award associated with the highest row collected in sequence is paid to the player and the feature game ends by returning to primary game play.

In one embodiment, following the final spin, beginning with row 101, each row is examined to determine if it has been collected until a row that has not been collected is encountered. As each collected row 101-109 is detected, the award for the feature game increments by the award 121-129 associated with the collected row. Any collected rows 101-109 above the level of the first uncollected row are not evaluated. For example, if at the end of the feature game, only row 101 has been collected, the feature game award will comprise only 10 credits according to prize 121. If rows 101, 102, and 103 have been collected, the feature game award will be 85 credits comprised of the prizes 121, 122 and 123 associated with the first three rows. Award 129 is associated with row 109. If all rows including row 109 have been collected, the progressive prize indicated by meter 199 is awarded to the player.

In one optional alternate embodiment, the amount of the progressive award display on progressive meter 199 and paid to the player is scaled in proportion to the amount of the player's wager. For example, on a game with a twenty-credit maximum wager, a single credit wager may only win $1/20^{th}$ the amount of the award available to a twenty-credit wager.

Figure 2:
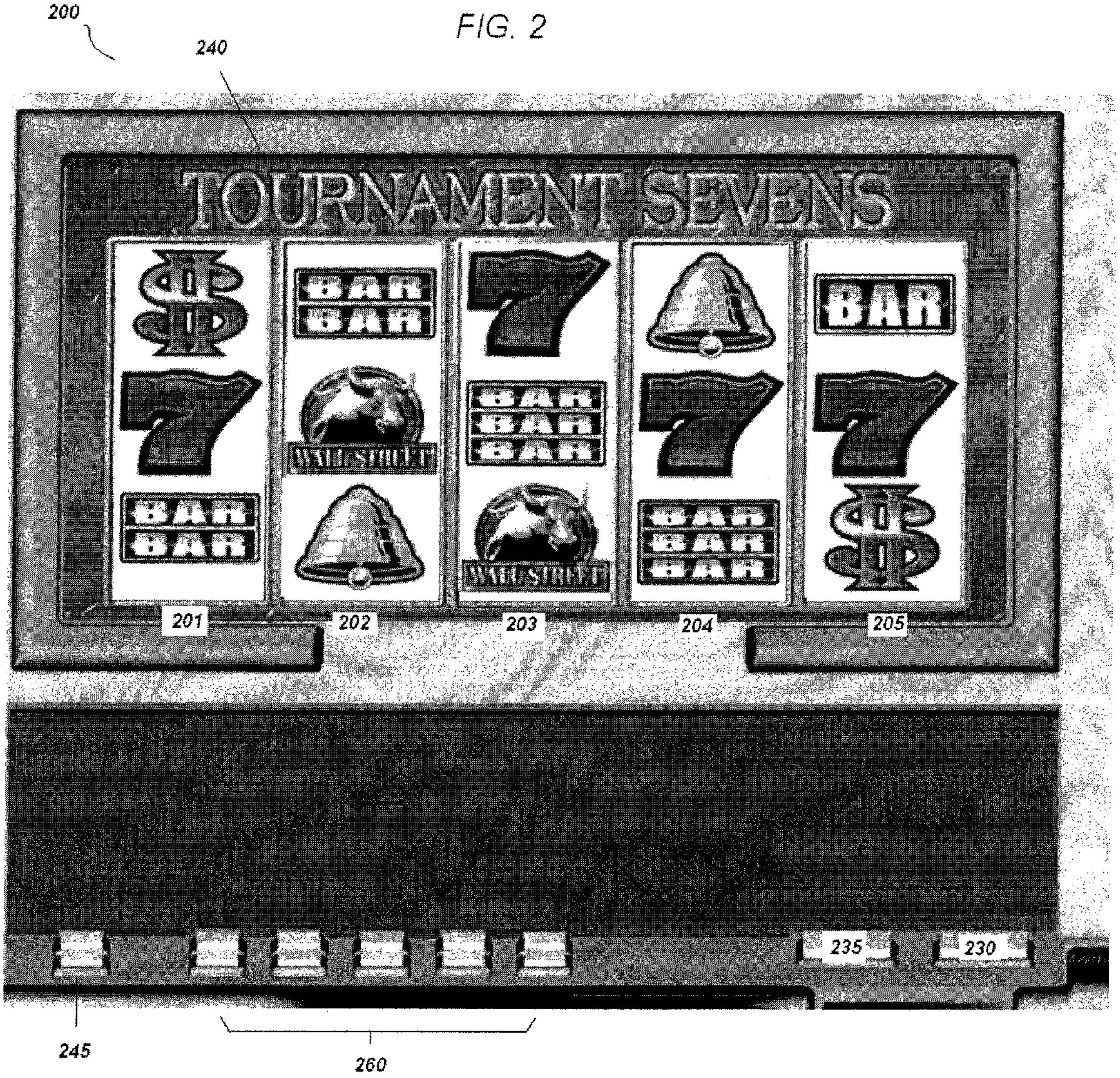
FIG. 2 illustrates an example primary game display in accordance with one or more embodiments of the invention.

Referring to FIG. 2, in accordance with one aspect of the invention, an example base game 200 is implemented using five simulated spinning reels 201-205 on primary game display 240. Each of 20 pay line patterns (not shown) passes through one indicium on each of the five reels 201-205. The number of pay lines and their patterns are by way of example only and may vary. The player selects the number of played pay lines and the number of credits or coins wagered on each line using touch screen controls (not shown) or gaming device control buttons 260. The player may also collect the balance of his credits by pressing COLLECT button 245.

A credit meter (not shown) displays the player's current credit balance, while other meters (not shown) may display, for example, the number of credits or coins wagered and the last amount paid by a payout mechanism (not shown). Other meters containing other information may be displayed. The amount wagered on each pay line may additionally be indicated in a bet tag (not shown) corresponding to each pay line.

The player initiates game play by pressing SPIN button 230. In some embodiments, the player may simultaneously select all pay lines at the maximum number of coins or credits allowed per line by pressing a MAX BET button 235. Corresponding touchscreen buttons (not shown) on display 240 may be used to perform the actions described here without deviating from the scope of the invention. A video representation of reels 201-205 is made to spin and stop in predetermined stop positions and then indicate whether the stop positions of the reels resulted in a winning game outcome.

Winning outcomes may be indicated on a pay table (not shown). The pay table may be accessible through a help button (not shown). In alternate embodiments, the pay table may be presented on a second video or printed display attached to the gaming device. A winning combination, for example, could be three or more dollar sign symbols adjacent to one another on an active pay line. For each winning combination, the game device awards the player the award in the pay table, adjusted as necessary based on the number of credits wagered on the pay line on which the win occurred. Some video representations of pay tables may factor in the amount of the player's wager and no additional award adjustment is required.

In various embodiments, winning combinations may be evaluated across adjacent reels from left-to-right, from right-to-left or both. Additional winning combinations may be awarded when certain indicia do not necessarily accumulate adjacently on a pay line, but rather, appear anywhere on the reels (i.e., "scatter pays"). In addition, "wild" indicia may be used to complete winning combinations. Some "wild" indicia may also cause completed winning combinations to be result in pay amounts in excess of the normal winning combination by way of multiplication or addition, for example, a wild doubler symbol may be used.

Various primary game outcomes may be utilized to trigger the play of the feature game, including, but not limited to, awarding bonus play when certain symbols appear on a pay line, when certain symbols are scattered, when no symbols of a certain type appear, when a certain winning combination occurs or, regardless of the visible symbols, at random or fixed intervals. The availability of the feature game may be restricted based on the size of the wager. In some embodiments, the feature game may be one of a set of primary games randomly selected for play following initiation of play by the player. For example, multiple primary games are disclosed in U.S. application Ser. No. 11/428,220, entitled "Multiple Primary Games Triggered by Random Number Generator," filed on Jun. 30, 2006, which is hereby incorporated by reference, in which a gaming machine has at least two distinct primary games. After receiving a wager, the gaming machine determines which primary game to activate. The selected primary game is activated and a game outcome is presented to the player on a game display. A payout may be awarded according to the game outcome. The availability of the game may be restricted based on the size of the wager.

Figure 3:
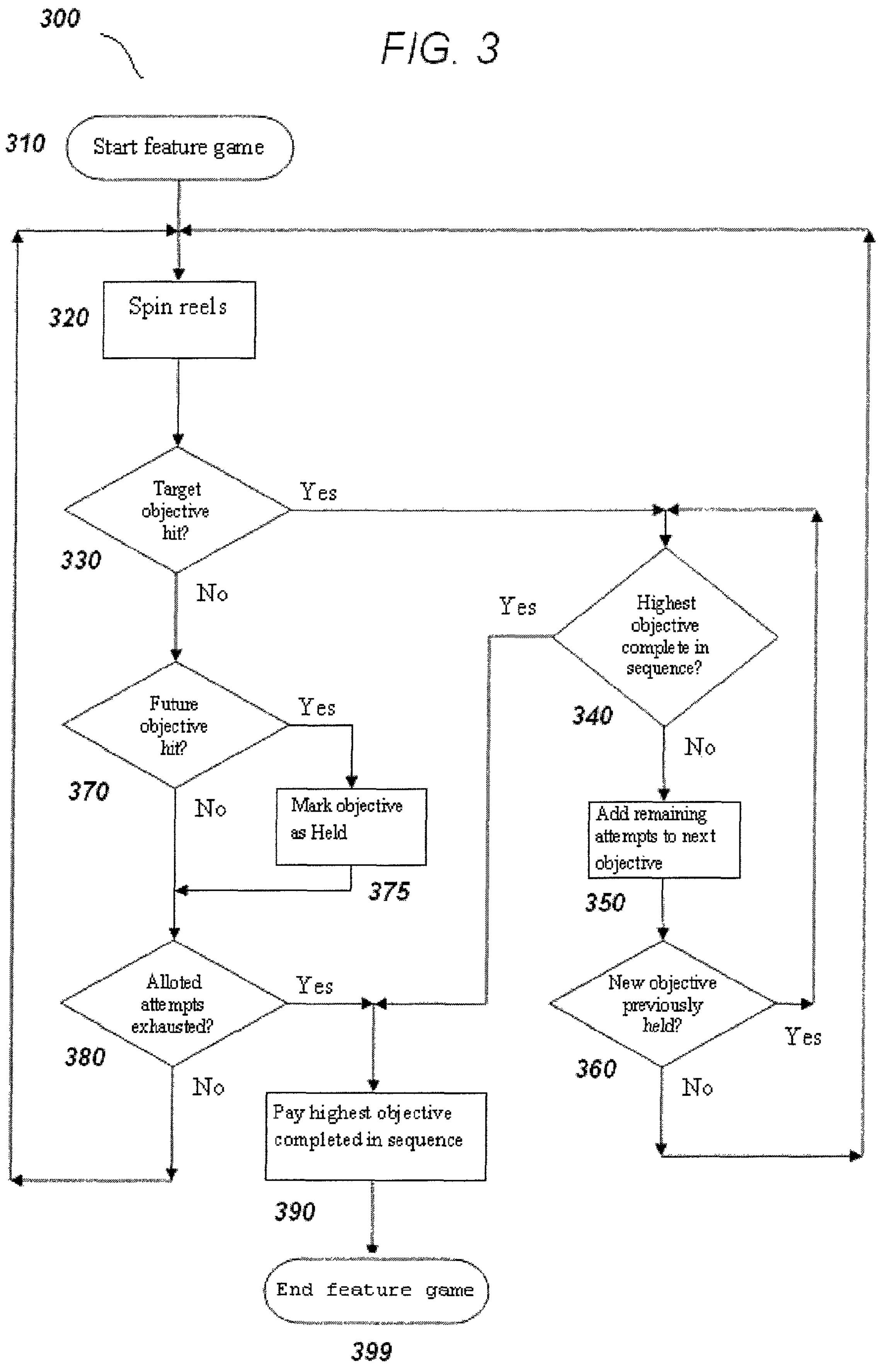
FIG. 3 is an example functional block diagram depicting the steps associated with carrying out a method in accordance of one or more aspects of the invention.

A logical flow diagram generally depicting the steps associated with an example method 300 for carrying out a feature game in accordance with one aspect of the invention is presented in FIG. 3. In one example implementation, a gaming program executable on a gaming processor may be prepared in accordance with conventional programming techniques and software to produced the desired affect as described by the blocks and flow paths in the flow diagram below. In another example implementation, the desired effect as described by the flow diagram below may be produced by utilizing an electro-mechanical apparatus, such as one using spinning reels together with an LCD top box display which may be implemented together with a random number generator configured in accordance with conventional mathematical modelling methods. The order of actions as shown in FIG. 3 and described below is only illustrative, and should not be considered limiting. For example, the order of the actions may be changed, additional steps may be added or some steps may be removed without deviating from the scope and spirit of the invention.

First, the feature game is initiated by a triggering event at block 310, for example, occurrence of a three adjacent like symbols on an active primary game pay line may have been predetermined to be the trigger for the feature game. Any predefined feature game trigger criteria may be used to initiate the feature game.

The spin portion of the feature game is presented at block 320, wherein all uncollected rows of reels are spun and stopped. The player may interact with the game to start or stop each spin by way of a user interface such as one or more buttons, a touchscreen or other suitable controls. The indicia displayed by the stopped positions of the reels are evaluated against the objective symbols for each row to see if the final symbol combination resulted in achievement of the objective for that row. First, the results for the current target row are evaluated at block 330.

If the objective for the target row was not achieved, a test is performed at block 370 to see if any higher future objective were achieved. If so, the row for the achieved objective is marked as accomplished at block 375. At block 380, a test is performed to see if all spin attempts allowed for the target row have been exhausted. If so, the player is awarded the prize associated with the highest completed objective in sequence at block 390 and the feature game ends at block 399. Awards for future objective that had been accomplished out of sequence are not paid. In one embodiment, the prizes for each of the objectives achieved in sequence are totalled to determine the feature game award.

If the objective for the target row was achieved at block 330, a further test is performed at block 340 to determine if the achieved objective was the final objective at block 340.

If the final objective was not achieved at block 340, any remaining spins from the current target row are added to the spins allocated for accomplishment of the objective on the next target row at block 350. In some embodiments, this step is not performed; rather, the default number of spins is assigned for accomplishment of the next objective. At block 360, a test is performed to see if the new objective was previously accomplished. If so, there is no need to perform a spin and flow returns to block 340 as described above, otherwise flow returns to block 320 to perform another reel spin.

If the final objective was achieved at block 340 the progressive prize indicated by a progressive meter such as meter 199 (FIG. 1) is awarded to the player at block 390 and the feature game ends.

Figure 4:
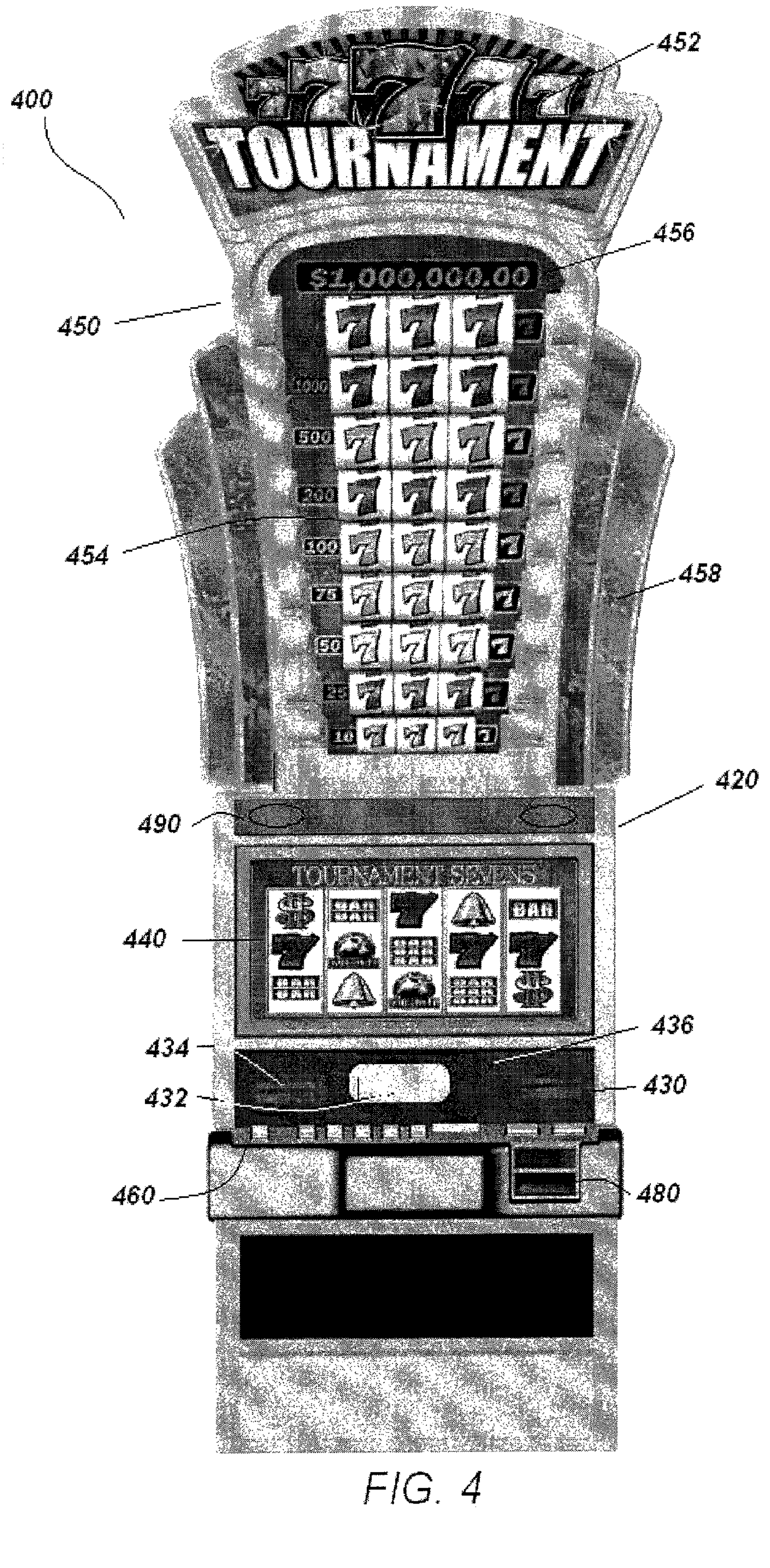
FIG. 4 is a perspective view of an example gaming machine in accordance with one aspect of the present invention.

Referring to FIG. 4, an example gaming machine 400 is shown including cabinet housing 420, primary game display 440, secondary game display 454 with multiple independently operable sets of virtual reels, player-activated buttons 460, player tracking panel 436, bill/voucher acceptor 480 and one or more speakers 490. Cabinet housing 420 is a self-standing unit that is generally rectangular in shape and may be manufactured with reinforced steel or other rigid materials which are resistant to tampering and vandalism. Cabinet housing 420 houses a processor, circuitry, and software (not shown) for receiving signals from the player-activated buttons 460, operating the games, and transmitting signals to the respective displays and speakers. Any shaped cabinet may be implemented with any embodiment of gaming machine 400 so long as it provides access to a player for playing a game. For example, cabinet 420 may comprise a slant-top, bar-top, or table-top style cabinet. The operation of gaming machine 400 is described more fully below.

The plurality of player-activated buttons 460 may be used for various functions such as, but not limited to, selecting a wager denomination, selecting a game to be played, selecting a wager amount per game, initiating a game, or cashing out money from gaming machine 400. Buttons 460 function as input mechanisms and may include mechanical buttons, electromechanical buttons or touch screen buttons. Optionally, a handle (not shown) may be rotated by a player to initiate a game.

In other embodiments, buttons 460 may be replaced with various other input mechanisms known in the art such as, but not limited to, a touch screen system, touch pad, track ball, mouse, switches, toggle switches, or other input means used to accept player input. For example, one input means is a universal button module as disclosed in U.S. application Ser. No. 11/106,212, entitled "Universal Button Module," filed on Apr. 14, 2005, which is hereby incorporated by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand.

Player tracking panel 436 includes player tracking card reader 434 and player tracking display 432. Voucher printer 430 may be integrated into player tracking panel 436 or installed elsewhere in cabinet housing 420 or top box 450.

Game display 440 presents a game of chance wherein a player receives one or more outcomes from a set of potential outcomes. For example, one such game of chance is a video slot machine game, an example of which is entitled Tournament Sevens, described above. In other aspects of the invention, gaming machine 400 may present a video or mechanical reel slot machine, a video keno game, a lottery game, a bingo game, a Class II bingo game, a roulette game, a craps game, a blackjack game, a mechanical or video representation of a wheel game or the like. In alternative embodiments, it may further be appreciated that games of skill or games of chance involving some player skill may be implemented with gaming machine 400.

Cabinet housing 420 includes top box 450 which contains "top glass" 452 comprising advertising or payout information related to the game or games available on gaming machine 400. Mechanical or video/mechanical embodiments may include game displays such as mechanical reels, wheels, or dice as required to present the game to the player. In video/mechanical or pure video embodiments, game display 440 is, typically, a CRT or a flat-panel display in the form of, but not limited to, liquid crystal, plasma, electroluminescent, vacuum fluorescent, field emission, or any other type of panel display known or developed in the art. Game display 440 may be mounted in either a "portrait" or "landscape" orientation and be of standard or "widescreen" dimensions (i.e., a ratio of one dimension to another of at least 16×9). For example, a widescreen display may be 32 inches wide by 18 inches tall. A widescreen display in a "portrait" orientation may be 32 inches tall by 18 inches wide. Additionally, game display 440 preferably includes a touch screen or touch glass system (not shown) and presents player interfaces such as, but not limited to, credit meter (not shown), win meter (not shown) and touch screen buttons (not shown). An example of a touch glass system is disclosed in U.S. Pat. No. 6,942,571, entitled "Gaming Device with Direction and Speed Control of Mechanical Reels Using Touch Screen," which is hereby incorporated by reference.

Game display 440 may also present information such as, but not limited to, player information, advertisements and casino promotions, graphic displays, news and sports updates, or even offer an alternate game. This information may be generated through a host computer networked with gaming machine 400 on its own initiative or it may be obtained by request of the player using either one or more of the plurality of player-activated buttons 460; the game display itself, if game display 440 comprises a touch screen or similar technology; buttons (not shown) mounted about game display 440 which may permit selections such as those found on an ATM machine, where legends on the screen are associated with respective selecting buttons; or any player input device that offers the required functionality.

Cabinet housing 420 incorporates a single game display 440. However, in alternate embodiments, cabinet housing 420 or top box 450 may house one or more additional displays or components used for various purposes including additional game play screens, animated "top glass," progressive meters or mechanical or electromechanical devices such as, but not limited to, wheels, pointers or reels. The additional displays may or may not include a touch screen or touch glass system. An example of a top box comprising an additional game play screen in accordance with one or more aspects of the invention may be seen by examining FIGS. 1, 4 and 5A-5B.

Figure 5A:
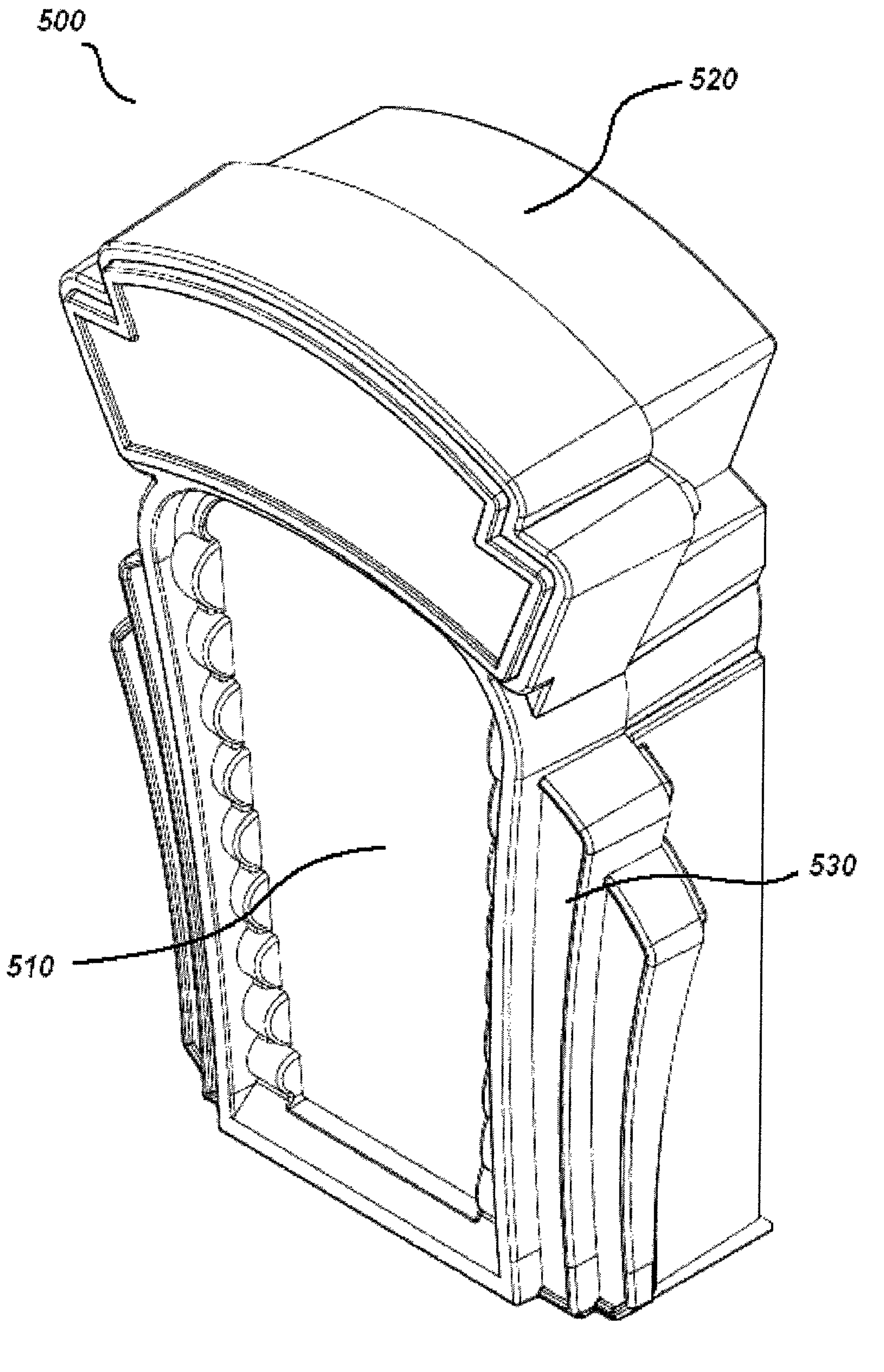
FIGS. 5A and 5B are views of an example portrait mode video display mounted in a cabinet in accordance with one or more embodiments of the invention.
Figure 5B:
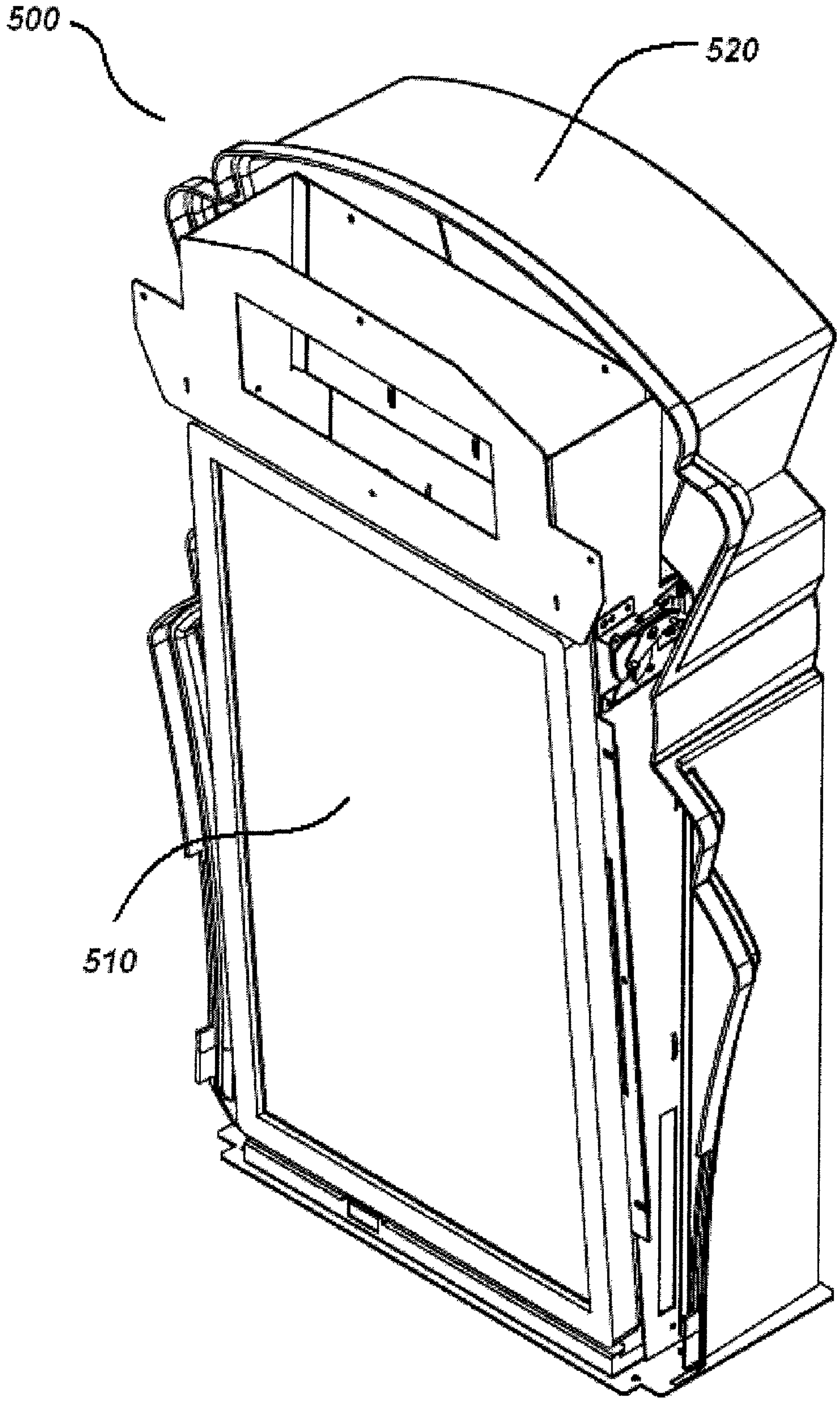

With reference with to FIGS. 5A and 5B, wherein like designations denote like elements, top box 500 includes top box display 510, top box housing 520, and top box trim bezel 530. Top box housing 520 is generally rectangular in shape, taller in height than in width, and may be manufactured with reinforced steel or other rigid materials which are resistant to tampering and vandalism. Top box housing 520 is configured for mounting on top of a gaming machine housing (see FIG. 4.) and may house a processor, circuitry, and software (not shown) for receiving signals from the slot machine and transmitting signals to top box display 510 or any additional lighting or speakers required (not shown). Top box 500 may be mounted on a gaming machine cabinet comprising a slant-top, bar-top, or table-top style cabinet. Any shaped gaming machine cabinet may be implemented with any embodiment of top box housing 500. Any shaped top box housing 520 may be implemented provided it is suitable for mounting top box display 510 such that top box trim bezel 530 overlays or conceals at least some part of the face of top box display 510. Portrait mode orientation positions the top box display 510 such that its longest dimension is oriented vertically. Landscape mode positions the top box display 510 such that its longest dimension is oriented horizontally.

Top box trim bezel 530 has been removed in FIG. 5B to illustrate the placement of top box display 510 in top box housing 520. In a preferred embodiment, top box display 510 is a widescreen display.

In some embodiments, top box housing 520 and top box trim bezel 530 are shaped according to the theme of a game implemented on the gaming machine to which top box housing 520 is attached. In other embodiments, top box housing 510 and top box trim bezel 520 are shaped generically for use with a variety of game themes. In one embodiment, top box housing 510 is generically shaped and top box trim bezel 520 is shaped according to a game theme. This allows a generic top box and gaming machine to be adapted from one game theme to another by simply replacing bezel 520 and the software associated with the operation of the game. Top box trim bezel 520 may be illuminated and contain graphics related to the game or games available on the gaming machine. The bezel may also contain cut-outs, as required, for player tracking hardware (not shown) such as, but not limited to, displays, keypads and card readers, or a progressive meter (FIG. 4, 456).

Figure 6:
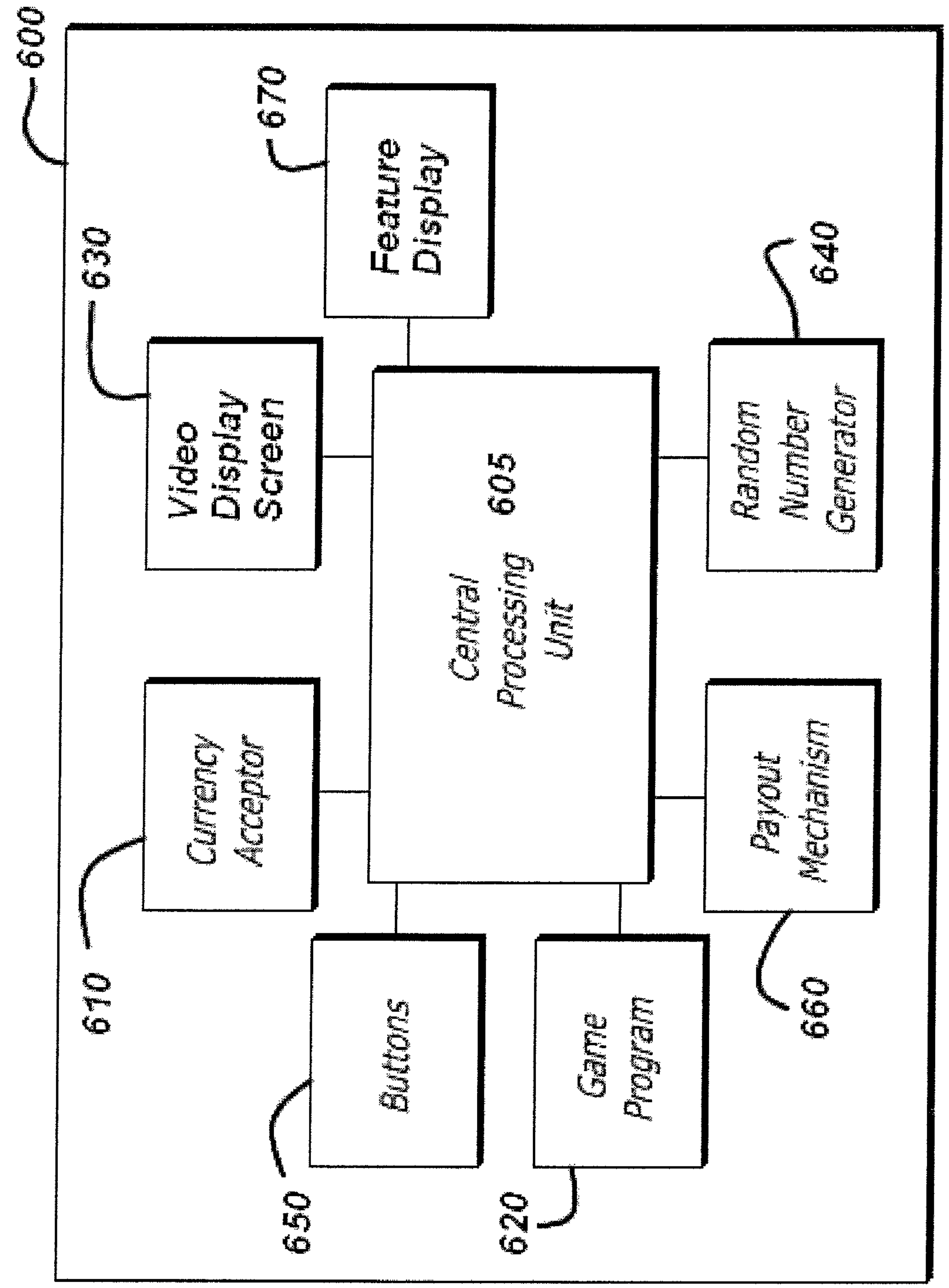
FIG. 6 is a block diagram of the physical and logical components of an example motherboard as may be implemented within the gaming machine of FIG. 4.

Referring to FIG. 6, a block diagram of an example gaming motherboard 600 is shown to include a functional interconnection of physical and logical components of gaming machine 500. Currency acceptor 610 is typically connected to a conventional central processing unit ("CPU") 605, such as an Intel Pentium microprocessor mounted on a gaming motherboard, by a serial connection such as RS-232 or USB. The gaming motherboard may be mounted with other conventional components, such as are found on conventional personal computer motherboards, and loaded with a gaming machine operating system (OS), such as an Alpha OS installed within a Bally S9000, M9000 or CineVision™ slot machine. CPU 605 executes game program 620 that causes video display 630 to display a game. In one embodiment, game program 620 is a game entitled entitled Tournament Sevens.

When a player has inserted a form of currency such as, for example and without limitation, paper currency, coins or tokens, cashless tickets or vouchers, electronic funds transfers or the like into currency acceptor 610, a signal is sent to CPU 605 which, in turn, assigns an appropriate number of credits for play. The player may further control the operation of gaming machine 600, for example, to select the amount to wager via electromechanical or touchscreen buttons 650. The game starts in response to the player pushing one of buttons 650 or an alternate start mechanism, for example, a handle or touch screen button. Random number generator 640 responds to instructions from CPU 605 to provide a display of randomly selected indicia on video display screen 630. Thereafter, the player may or may not interact with the game through electromechanical or touchscreen buttons 650 to change the displayed indicia. Finally, CPU 605 under control of game program 620 compares the final display of indicia to a pay table. The set of possible game outcomes may include a subset of outcomes related to the triggering of a feature game. In the event the displayed outcome is a member of this subset, CPU 605, under control of game program 620, causes additional game play to be presented on video display screen 630 as described above.

Predetermined payout amounts for certain outcomes, including feature game outcomes, are stored as part of game program 620. Such payout amounts are, in response to instructions from CPU 605, provided to the player in the form of coins, credits or currency via payout mechanism 660, which may be one or more of a credit meter, a coin hopper, a voucher printer, an electronic funds transfer protocol or any other payout means known or developed in the art.

In some embodiments of gaming motherboard 600, game program 620 is stored in a memory device (not shown). By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with gaming motherboard 600 are stored in the same or a separate memory device (not shown).

Figure 7:
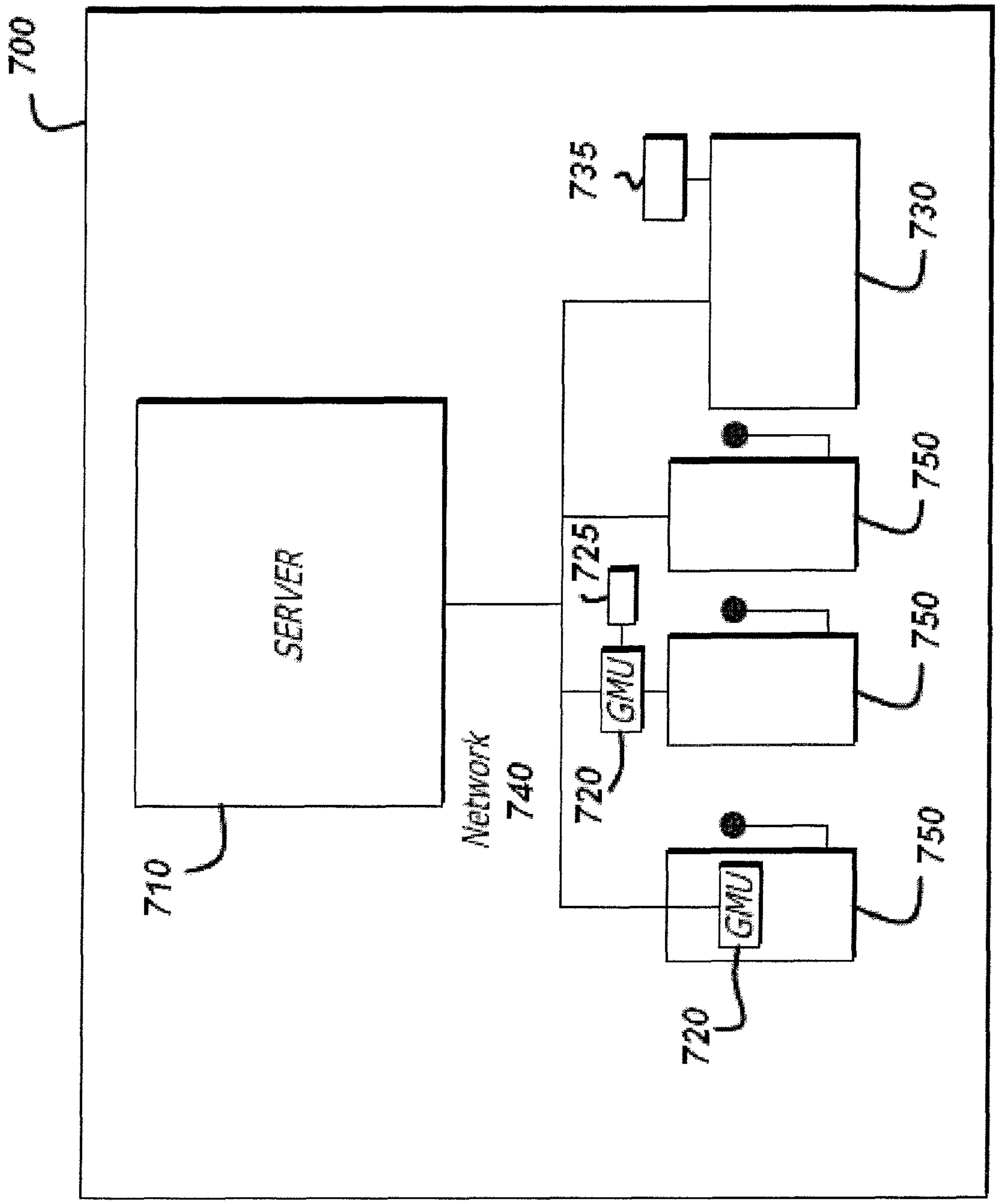
FIG. 7 is an example schematic block diagram showing the hardware elements of a networked gaming system in accordance with one or more aspects of the present invention.

Referring to FIG. 7, in accordance with one aspect of the invention, gaming system 700 includes host computer or server 710, gaming machines 750, and network 740 connecting gaming machines 750 to server 710. Additionally, gaming display computer 730 is shown connected to network 740. Server 710 may be selected from a variety of conventionally available servers. The type of server used is generally determined by the platform and software requirements of the gaming system. Examples of suitable servers are an IBM RS6000-based server, an IBM AS/400-based server or a Microsoft Windows-based server, but it should be appreciated that any suitable server may be used. It may also be appreciated that server 710 may be configured as a single "logical" server that comprises multiple physical servers. Gaming machines 750 operate similar to conventional peripheral networked terminals. Gaming machines 750 have a player interface such as a display, a card reader, and selection buttons through which gaming machines 750 interact with a player playing a wagering game with a video display top box game in accordance with various embodiments of the invention. The player interface is used for making choices such as the amount of a bet or the number of lines to bet. Gaming machines 750 also provide information to server 710 concerning activity on gaming machines 750 and provide a communication portal for players with server 710. For example, the player interface may be used for selecting different server-related menu options such as, but not limited to, transferring a specified number of credits from a player account onto the credit meter of the gaming machine, or for transferring credits from the gaming machine to a central player account.

In various embodiments, any of the gaming machines 750 may be a mechanical reel spinning slot machine, video slot machine, video poker machine, keno machine, video blackjack machine, or a gaming machine offering one or more of the above described primary games including a video display top box game in accordance with one or more embodiments of the invention. Networking components (not shown) facilitate communications across network 740 between the system server 710 and game management units 720 and/or gaming display control computers 730 that control displays for carousels of gaming machines. Game management units (GMU's) 720 connect gaming machines to networking components and may be installed in the gaming machine cabinet or external to the gaming machine. The function of the GMU is similar to the function of a network interface card connected to a desktop personal computer (PC) and it may contain tracking software which provides notification to the casino of certain events on a gaming machine 750, including wins. Depending upon the casino management system, payouts on large wins at gaming machines 750 may be made directly to a player account managed by the host computer; in which case, the player is notified by way of the GMU at gaming machine 750 that the player's account has been credited.

Some GMU's have much greater capability and can perform such tasks as presenting and playing a game having a simultaneous multi-play feature game using a display 725 operatively connected to GMU 720. In one embodiment, GMU 720 is a separate component located outside the gaming machine. Alternatively, in another embodiment, the GMU 720 is located within the gaming machine. Optionally, in an alternative embodiment, one or more gaming machines 750 connect directly to the network and are not connected to a GMU 720. Displays related to games offering a simultaneous multi-play feature game on gaming machines 750 or GMU displays 725 may also be presented on gaming display 735 by gaming display control computer 730. An example of a display control computer is disclosed in U.S. application Ser. No. 11/463,793, entitled "Reconfigurable Gaming Display and System," filed on Aug. 10, 2006, which is hereby incorporated by reference in its entirety.

A gaming system of the type described above also allows a plurality of games in accordance with the various embodiments of the invention to be linked under the control of server 710 for cooperative or competitive play in a particular area, carousel, casino or between casinos located in geographically separate areas.

One will appreciate that a gaming system may also comprise other types of components, and the above illustrations are meant only as examples and not as limitations to the types of components or games having a simultaneous multi-play feature game. Additionally, it may further be appreciated that each of the games could be operated on a remote host computer such that a player initiates play with the host computer over a network via the player interface and gaming machine 750 operates the respective gaming and video displays in conjunction with the game whose play is controlled by the remote computer. In another example, the host computer provides a progressive controller which controls one or more progressive pools associated with networked games having a video display top box in accordance with one or more embodiments of the invention.

The various embodiments described above are provided by way of illustration only and should not be construed to limit the invention. For example, the availability of the feature for play may be restricted based on the size or nature of the player's wager. The number of objectives available to the player or the number of attempts for each objective may also be limited accordingly. A widescreen display may be in a ratio of other than 16×9. A video top box containing a simultaneous multi-play feature game may be shared by a number of gaming machines. A game in accordance with one or more aspects of the invention may be one of a set of primary games randomly selected for play following initiation of play by the player. For example, U.S. application Ser. No. 11/428,220, entitled "Multiple Primary Games Triggered by Random Number Generator," filed on Jun. 30, 2006, hereby incorporated in by reference its entirety, discloses a gaming machine including at least two distinct primary games. After receiving a wager, the gaming machine determines which primary game to activate. The selected primary game is activated and a game outcome is presented to the player on a game display. A payout may be awarded according to the game outcome. The availability of one or more of the games may be restricted based on the size of the wager. In another embodiment, a game in accordance with one or more aspects of the invention may be associated with a table game such a poker or blackjack. For example, a player may receive a chance to play a simultaneous multi-play feature game located adjacent to a gaming table as a result of a hand of cards dealt to him during play of the table game.

Furthermore, while the objectives are represented as sets of spinning reels in the exemplar embodiments, the objectives may also be represented in other ways; for example, by dice, wheels, cards, or other indicia. The number of attempts may be determined by prompting the player to select one of multiple items which hide randomly determined values. The item selected by the player reveals the number of attempts allowed to complete each objective. In some embodiments, the number of attempts for each objective decreases with each objective, thereby increasing the difficulty of completing each subsequent objective. In alternate embodiments, the number of attempts for each objective increases with each objective, thereby decreasing the difficulty of completing each subsequent objective. The player may, at any time, complete a special objective which acts as an instant winner, awarding the player with the maximum prize or an accumulation of all prizes. If the player repeats an objective that is already complete, the player may receive an additional award. Those skilled in the art will readily recognize that these and various other modifications and changes may be made to the invention without following the example embodiments and applications illustrated and described herein, and without departing from the true spirit and scope of the invention.

What is claimed is:

1. A wagering game for a gaming machine including a processor and a memory device, the wagering game comprising:

a primary game and a feature game, both stored in the memory device and controlled by the processor, the primary game comprising a set of game plays; and the feature game comprising:

a plurality of simultaneously activatable sets of reels, each of the sets of reels including a plurality of individually rotatable indicia-bearing reels; wherein the sets of reels are simultaneously activated, upon a triggering event associated with the primary game, to rotate and reveal either a winning outcome or a non-winning outcome for each of the sets of reels;

one or more subsequent simultaneous activations of any sets of reels for which no winning outcome has yet been revealed, wherein the one or more subsequent simultaneous activations are repeated until the feature game is terminated by a second triggering event; and an award payable by the feature game upon its termination, the award being a value associated with only the most valuable winning outcome revealed during play of the feature game by any of the plurality of sets of reels.

2. The wagering game of claim 1 further comprising a wager, wherein the award payable is scaled according to the wager.

3. The wagering game of claim 1 further comprising a progressive award.

4. A method of operating a game having a primary game and a feature game on a gaming machine including a processor, the method comprising:

the processor of the gaming machine programmed to perform the steps of:

accepting a wager from a player;

initiating play of the primary game according to the wager;

upon a triggering event associated with the primary game, initiating the feature game, the feature game comprising a plurality of sets of reels, each of the sets of reels including a plurality of individually rotatable indicia-bearing reels;

simultaneously activating the plurality of sets of reels to rotate and display either a winning outcome or a non-winning outcome for each of the sets of reels;

repeatedly simultaneously activating the plurality of sets of reels to rotate and display a new winning outcome or non-winning outcome for any of the sets of reels that have not yet displayed a winning outcome until the feature game is terminated by a second triggering event; and paying an award after the feature game is terminated, the award being a value associated with only the most valuable winning outcome revealed during play of the feature game by any of the plurality of sets of reels.

5. The method of claim 4 further comprising the processor programmed to perform the step of restricting play of the feature game based on the amount of the wager.

6. The method of claim 4, wherein all of the plurality of sets of reels are simultaneously positioned to display the same outcome.

7. The method of claim 4 further comprising one or more awards associated with outcomes displayed by the plurality of sets of reels.

* * * * *